INVENTOR.
Daniel E. Pike
BY
Ralph B. Brick

INVENTOR.
Daniel E. Pike
BY
Ralph B. Brick

_United States Patent Office_

3,541,761
Patented Nov. 24, 1970

3,541,761
METHOD OF TREATING HOT WASTE GASES FROM A METALLURGICAL FURNACE
Daniel E. Pike, Louisville, Ky., assignor to American Air Filter Company, Inc., Louisville, Ky., a corporation of Kentucky
Filed Aug. 19, 1968, Ser. No. 753,397
Int. Cl. B01d 47/06
U.S. Cl. 55—89                                     5 Claims

ABSTRACT OF THE DISCLOSURE

A process for treating hot waste gases emanating from a metallurgical furnace wherein the hot gases are cooled in countercurrent flow with a liquid in a gas cooling tower, the liquid subsequently being cooled and recirculated to such gas cooling tower.

BACKGROUND OF THE INVENTION

Figure 1:
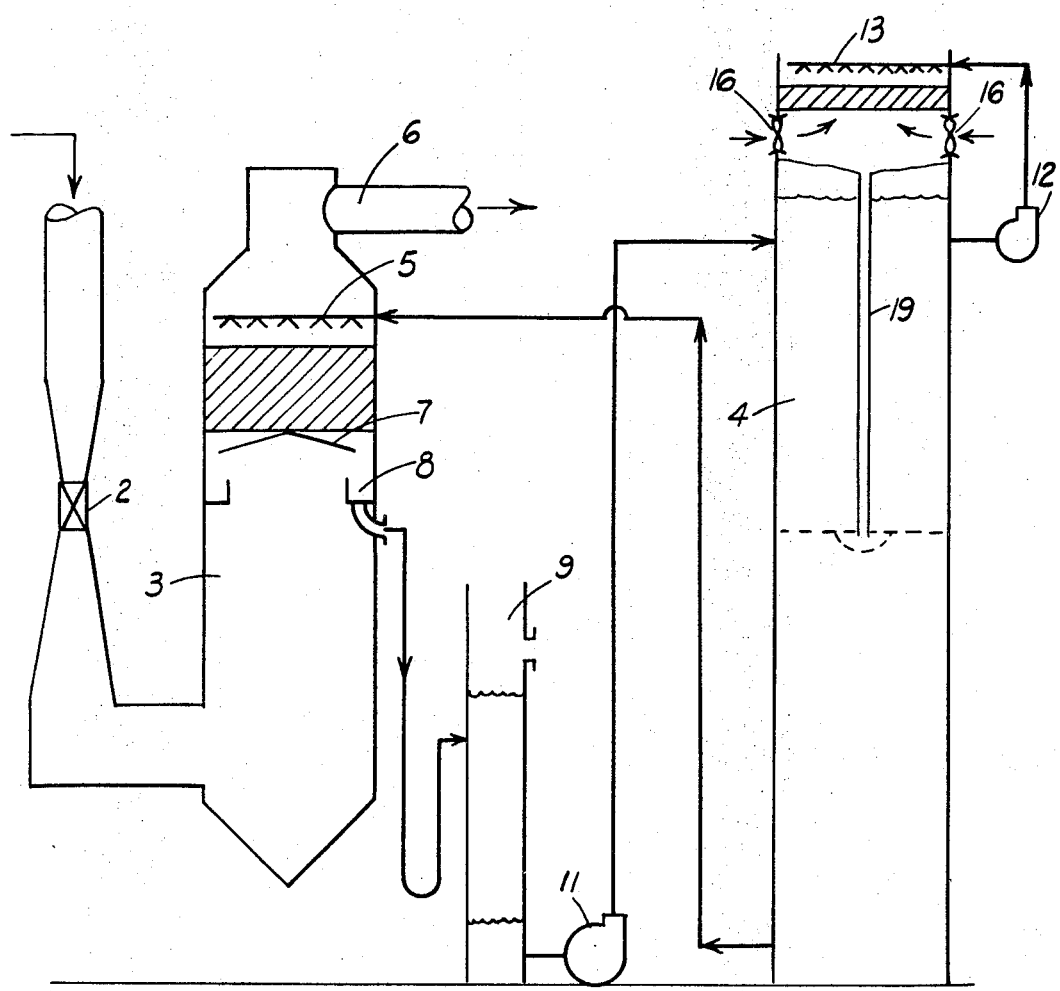

The present invention relates to a method of treating waste gases emanating from metallurgical furnaces, and more particularly, to a method of treating such waste gases in a series of gas and liquid contact steps. In treating waste gases emanating from metallurgical furnaces, it is desirable to cool such waste gases to condense the steam therefrom and thus reduce the size and power requirements of the waste gas fan motor. In many metallurgical systems, the cooling liquid requirements have been great for short periods of time, necessitating large liquid storage and liquid moving facilities which are costly in construction, operation, and maintenance, and which further require large quantities of liquid.

SUMMARY OF THE INVENTION

The present invention, recognizing the disadvantages of past systems, provides an efficient method for treating waste gases emanating from metallurgical furnaces, the present invention eliminating the need for great quantities of cooling water from external sources, reducing pumping and fan power requirements and saving valuable land space.

Various other features of the present invention will become obvious to one skilled in the art upon reading the disclosure set forth hereinafter.

More particularly, the present invention provides a process for treating hot waste gases emanating from a metallurgical furnace comprising: passing the hot waste gases through a gas cooling tower in countercurrent direction to a cooling liquid whereby heat is removed from the waste gases and added to the cooling liquid; passing the heated liquid from the gas cooling tower to a liquid cooling tower in countercurrent direction to a cooling gas whereby heat is removed from the liquid; and recirculating the cooled liquid from the liquid cooling tower to the gas cooling tower. In addition, the present invention provides a novel method wherein the heated liquid from the gas cooling tower is passed to the upper portion of a liquid storage reservoir before it is passed to the liquid cooling tower, and the cooled liquid from the liquid cooling tower is passed to the lower portion of the liquid storage reservoir before it is recirculated to the gas cooling tower.

It is to be understood that various changes can be made by one skilled in the art in the several steps of the method set forth herein without departing from the scope or spirit of the present invention.

Figure 2:
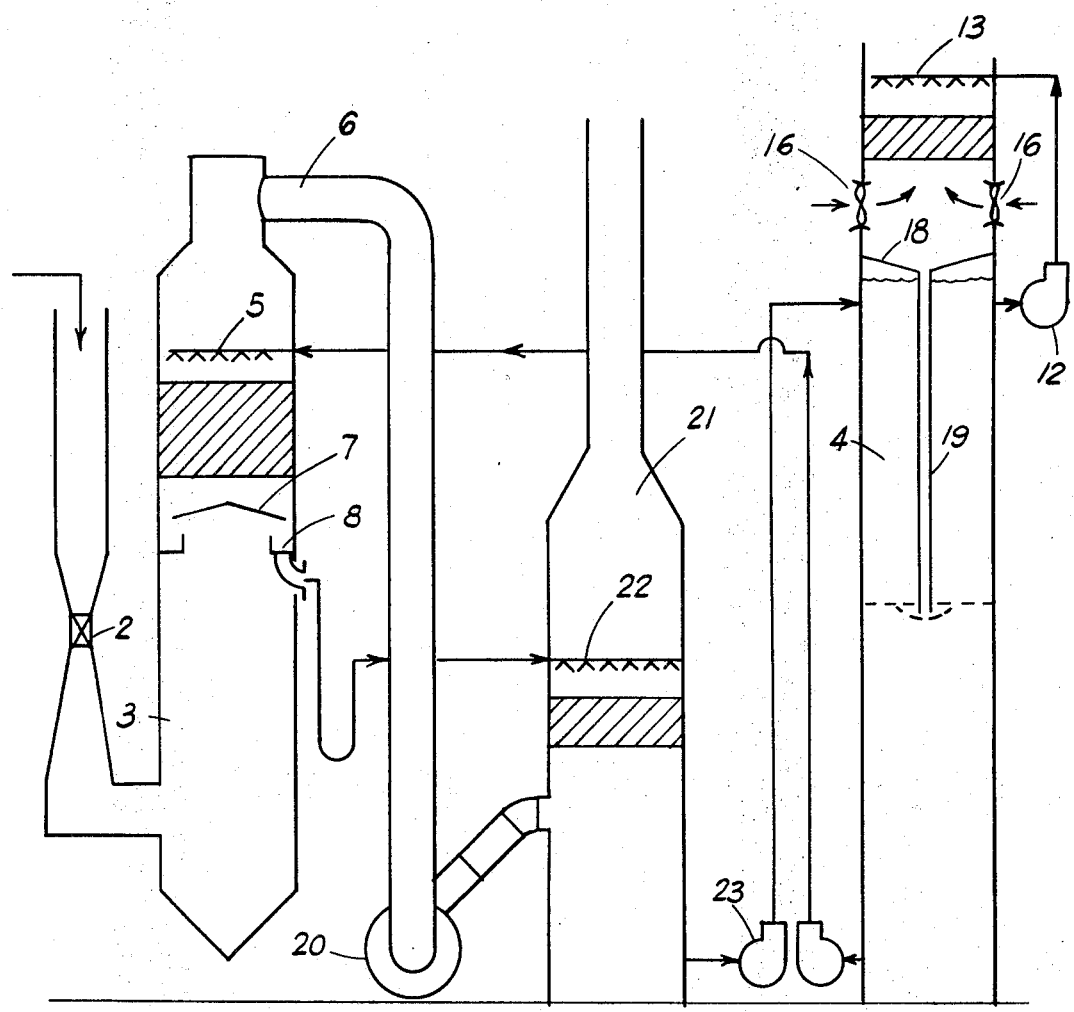

Referring to the drawings which disclose one advantageous embodiment of the present invention and a modification thereof:

FIG. 1 is a schematic flow diagram of the novel process for treating hot waste gases emanating from a metallurgical furnace; and FIG. 2 is a further modification of the novel arrangement of FIG. 1, including an additional cooling tower wherein the liquid is further cooled by previously cooled exhaust waste gases emanating from an upstream cooling tower.

Referring to FIG. 1 of the drawing, hot waste gases emanating from a metallurgical furnace (not shown) are introduced upstream a kinetic scrubber 2 which can be any one of several types known in the art, and advantageously, can be of a venturi-type arrangement as disclosed. At the kinetic scrubber, contaminant particles are separated from the waste gases by means of a scrubbing liquid, the waste gases then proceeding to the lower portion of the cooling tower 3 with the liquid settling out in the sump portion of cooling tower 3. As the waste gases proceed upwardly in cooling tower 3, cooling liquid from liquid storage reservoir 4 is introduced in countercurrent relation through sprays 5 at the upper portion of cooling tower 3. The cooled waste gases are passed on through conduit 6 and the cooling liquid which has been increased in temperature as a result of contact with the hot waste gases is guided by baffle 7 into trough 8 where it is passed to standpipe 9. Standpipe 9 serves to increase the head on the pump 11 which pumps the liquid back into the upper portion of storage reservoir 4. A pump 12 connected with the upper portion of storage reservoir 4 pumps the hot liquid from the upper portion of such reservoir to spray 13 and the liquid is passed in countercurrent cooling relation to ambient air introduced by fans 16 above baffle plate 18 which extends above the reservoir and serves as a trough to collect the cooled liquid. The trough, in turn, is connected to the lower portion of reservoir 4 by means of conduit 19 to introduce the cooled liquid into such lower portion of the reservoir. It is to be understood that pipe 19 can be suitably insulated so as not to conduct the heat of the liquid in the upper portion of reservoir 4. Advantageously, a suitable lining of cement can be utilized. In this manner, a temperature gradient is maintained in reservoir 4 from the bottom to the top of the vessel. As the heat from the process is put into the reservoir, the top portion becomes hotter and deeper with the total amount of liquid in the reservoir remaining constant.

In FIG. 2 of the drawing, substantially the same system is disclosed, but with an additional feature added. In this figure, an additional liquid cooling stack 21 is included, the hot gases emanating through conduit 6 being introduced by blower 20 into the lower portion of liquid cooling stack 21 and the liquid entrained by trough 8 being recirculated to spray 22 in the upper portion of the cooling stack 21. As a result of this arrangement, the heated liquid and the cooled gases from tower 3 once again flow in countercurrent relationship and thus some of the heat is taken out of the heated liquid by means of the cooled waste gas before such heated liquid is returned by means of pump 23 to the upper portion of reservoir 4 where the remaining heat put into the liquid accumulates to be discharged by air from fan 16 when the liquid is pumped to spray 13 by pump 12.

The invention claimed is:

1. A process for treating hot waste gases emanating from a metallurgical furnace comprising: passing said hot waste gases through a gas cooling tower in countercurrent direction to a cooling liquid whereby heat is removed from said waste gases and added to said cooling liquid; passing said heated liquid from said gas cooling tower to the upper portion of a liquid storage reservoir and then to a liquid cooling tower in countercurrent direction to a cooling gas whereby heat is removed from said liquid; passing said cooled liquid to the lower portion of said liquid storage reservoir; and then recirculating said cooling liquid from said liquid storage reservoir to said gas cooling tower.

2. The process of claim 1 wherein said waste gases are passed through a kinetic scrubber before being passed to said gas cooling tower.

3. The process of claim 1, wherein said cooled waste gases are passed from said gas cooling tower to a liquid cooling tower and said heated liquid from said gas cooling tower is also passed through said liquid cooling tower in countercurrent flow to said cooled waste gases.

4. The process of claim 1, wherein said heated liquid from said gas cooling tower is passed to the upper portion of a liquid storage reservoir before it is passed to said liquid cooling tower and said cooled liquid from said liquid cooling tower is passed to the lower portion of said liquid storage reservoir before it is recirculated to said gas cooling tower.

5. The process of claim 1 wherein said cooled liquid from said storage reservoir is recirculated to said gas cooling tower by maintaining the liquid level in said storage reservoir above the level of liquid introduction in said cooling tower.

References Cited

UNITED STATES PATENTS

| | | | |
|---|---|---|---|
| 1,182,543 | 5/1916 | Ferguson | 55—90 |
| 1,942,072 | 1/1934 | Sperr | 55—90 X |
| 2,242,294 | 5/1941 | Fox et al. | 55—89 X |
| 2,843,217 | 7/1958 | Linde | 55—223 X |
| 3,018,231 | 1/1962 | Valentine et al. | 55—228 X |
| 3,212,235 | 10/1963 | Markant | 55—89 X |
| 3,404,512 | 10/1968 | Tomany | 55—89 |

JOHN ADEE, Primary Examiner

U.S. Cl. X.R.

55—90, 94